(No Model.)
J. W. DUNCAN & C. L. MILLS.
CUTTING MECHANISM FOR HARVESTERS.
No. 358,388. Patented Feb. 22, 1887.
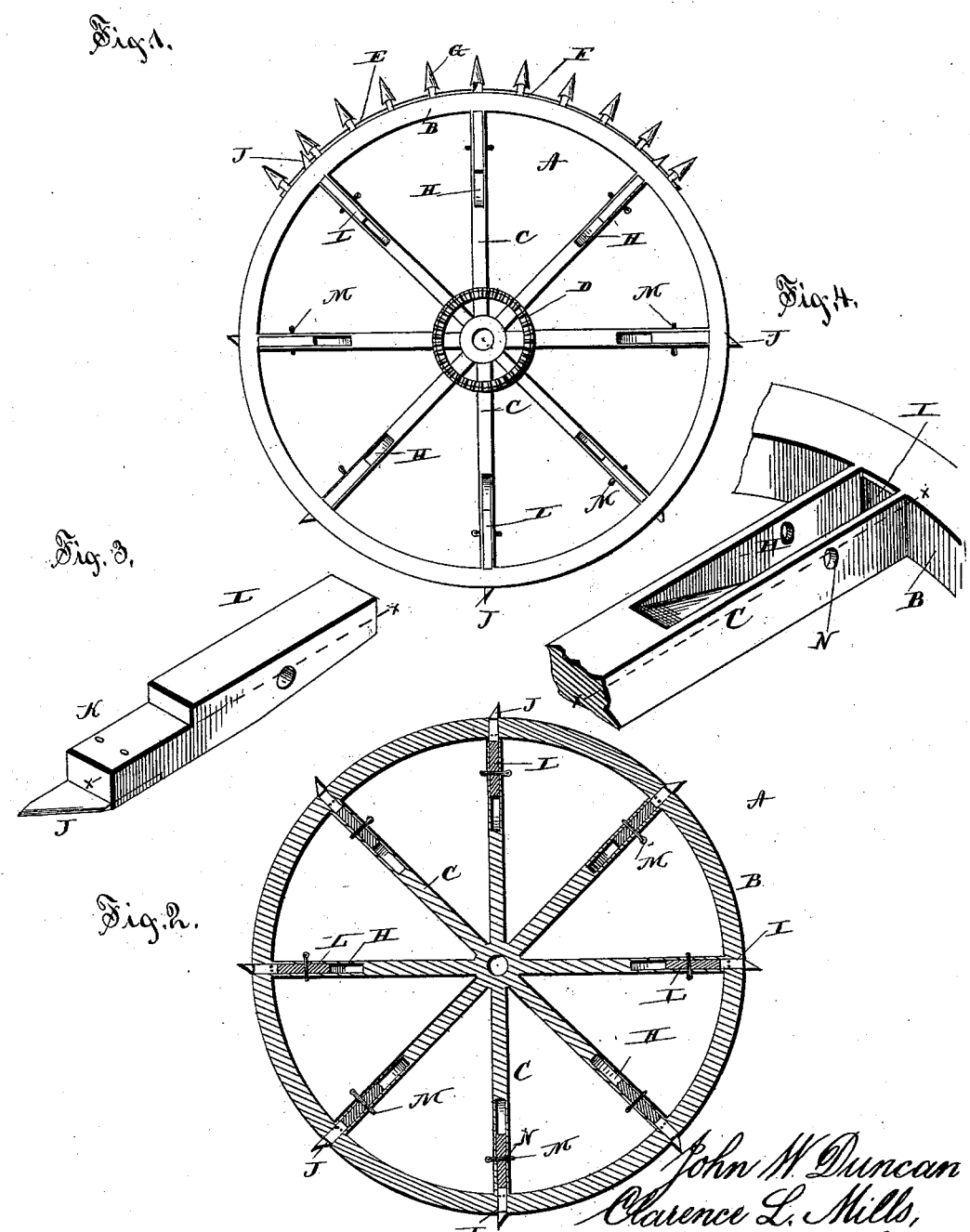

UNITED STATES PATENT OFFICE.

JOHN W. DUNCAN AND CLARENCE L. MILLS, OF ADRIAN, MISSOURI.

CUTTING MECHANISM FOR HARVESTERS.

SPECIFICATION forming part of Letters Patent No. 358,388, dated February 22, 1887.

Application filed July 24, 1886. Serial No. 208,937. (No model.)

*To all whom it may concern:*

Be it known that we, JOHN W. DUNCAN and CLARENCE L. MILLS, both residents of Adrian, in the county of Bates and State of Missouri, have invented certain new and useful Improvements in Revolving Cutting Mechanism for Harvesters; and we do hereby declare that the following is a full, clear, and exact description of the invention, which will enable others skilled in the art to which it appertains to make and use the same, reference being had to the accompanying drawings, which form a part of this specification, and in which—

Figure 1 is a top view of our improved revolving cutter for harvesters and mowers. Fig. 2 is a diametrical sectional view of the same, taken on the lines $x$ $x$ of Figs. 3 and 4. Fig. 3 is a perspective view, on an enlarged scale, of one of the knives and its handle; and Fig. 4 is a perspective detail view, on an enlarged scale, of one of the spokes of the cutter-wheel with the knife removed.

Similar letters of reference indicate corresponding parts in all the figures.

Our invention has relation to that class of cutting mechanism for harvesters and mowing machines in which a wheel having a number of radiating cutters is journaled to revolve in a horizontal plane with the cutters traveling in suitable guard-fingers arranged in a segmental series upon a segmental finger-bar at the forward edge of the wheel; and it consists in the improved construction and combination of parts of the same, as hereinafter more fully described and claimed.

In the accompanying drawings, the letter A indicates the wheel, which consists of the rim B and the spokes C, which may be in any desired number, according to the size of the wheel, and this wheel is provided at its center with a suitable gear-wheel, D, to which rotary motion is communicated by any suitable means, the gear-wheel being either a pinion or a chain wheel, or any other form of gear-wheel.

E is the finger-bar which fits around the forward portion of the rim of the wheel, having a suitable recess or groove, F, for its reception, and this finger-bar is provided with guard-fingers G, of the usual construction, projecting from the finger-bar and secured to it in any desired manner.

The spokes of the wheel are formed upon the upper sides of their outer ends with radiating recesses H, having their inner ends slightly inclined, and extending with their outer ends to the inner side of the rim, and the rim is provided with apertures or recesses I, registering with the recesses in the spokes and forming outward continuations of the same, being, however, not extended through the upper side of the rim.

The cutters J are formed with straight rear edges and with oblique forward cutting-edges, and are secured at their inner ends to the reduced or shouldered outer ends, K, of the handles L, the said handles fitting in the recesses in the spokes, with the cutters projecting through the apertures in the rim of the wheel, which, together with the reduced outer ends of the handles, fit into the apertures and fill them out.

A suitable key, M, passes through perforations, N, in the spoke and through the handle, retaining each cutter in its proper recess, the shoulder of each handle bearing against the inner side of the rim at the outer end of the recess in the spoke.

It will thus be seen that when the machine is propelled the wheel is revolved, drawing the cutters through the slots in the guard-fingers and cutting the grass or grain in the same manner as in a harvester or mowing-machine having reciprocating cutters, and the cutters may easily be removed from the wheel and sharpened by simply removing the keys or pins, when the handles and cutters may be removed from the recesses by drawing them toward the center of the wheel, the inclined rear or inner ends of the recesses forcing the handles upward, and the handles will be convenient for holding the cutters while sharpening them.

Having thus described our invention, we claim and desire to secure by Letters Patent of the United States—

1. In combination with a segmental finger-bar of a harvester or mowing-machine, a wheel revolving with the forward portion of its rim in the groove of the finger-bar, and having longitudinal recesses in the upper sides of its spokes and registering perforations in its rim, and handles secured in the recesses with their cutters projecting out through the perforations in the rim, as and for the purpose shown and set forth.

2. In a revolving cutting mechanism for harvesters, the combination of a wheel having suitable means for revolving it and formed with longitudinal recesses in the upper sides of its spokes, having inclined inner ends and formed with registering perforations or apertures in the rim, handles fitting in the recesses and having reduced outer ends, cutters secured at their inner ends to the reduced ends of the handles and projecting with the said reduced ends through the apertures in the rim, and keys or pins inserted through the spokes and handles, retaining them in the recesses, as and for the purpose shown and set forth.

In testimony that we claim the foregoing as our own we have hereunto affixed our signatures in presence of two witnesses.

JOHN W. DUNCAN.
CLARENCE L. MILLS.

Witnesses:
J. C. SHEPHERD,
W. H. LEARMAN.